United States Patent [19]

Ammeraal

[11] Patent Number: 4,739,876
[45] Date of Patent: Apr. 26, 1988

[54] PLATFORM CONVEYOR

[75] Inventor: Thomas C. M. Ammeraal, Wormer, Netherlands

[73] Assignee: Weimar, N.V., Netherlands

[21] Appl. No.: 818,794

[22] Filed: Jan. 14, 1986

[30] Foreign Application Priority Data

Jan. 17, 1985 [NL] Netherlands .......................... 8500101

[51] Int. Cl.$^4$ ............................................. B65G 17/16
[52] U.S. Cl. ...................................... 198/799; 198/594
[58] Field of Search ............... 198/586, 594, 799, 588; 414/78, 79, 137, 139, 140

[56] References Cited

U.S. PATENT DOCUMENTS 3,684,079 8/1972 Kuehl .................................. 198/799
3,732,970 5/1973 Nakanishi et al. .................. 198/799

FOREIGN PATENT DOCUMENTS 7008024 12/1970 Netherlands .
1297769 2/1970 United Kingdom .
1446859 8/1976 United Kingdom ................ 198/799

Primary Examiner—Robert J. Spar
Assistant Examiner—Lyle K. Kimms
Attorney, Agent, or Firm—Lorusso & Loud

[57] ABSTRACT

The invention relates to a platform conveyor, comprising a plurality of rectangular platforms, each being flexible in one direction, and two pairs of endless chains having equal lengths, and the pairs being connected to the corners at the front and rear side, respectively, of the platforms and being led over pairs of aligned guide sprockets, the chains extending substantially parallel to each other and guiding the platforms in a horizontal position through a transport part from an upper load or unload point to a lower unload or load point or vice versa, and bringing the platforms back through a return part, wherein the transport part includes a section having a substantial vertical component, and the platforms are deflected at both load and unload points. A guide assembly is provided to adjust the height between the upper load or unload point and the lower unload or load point.

7 Claims, 5 Drawing Sheets

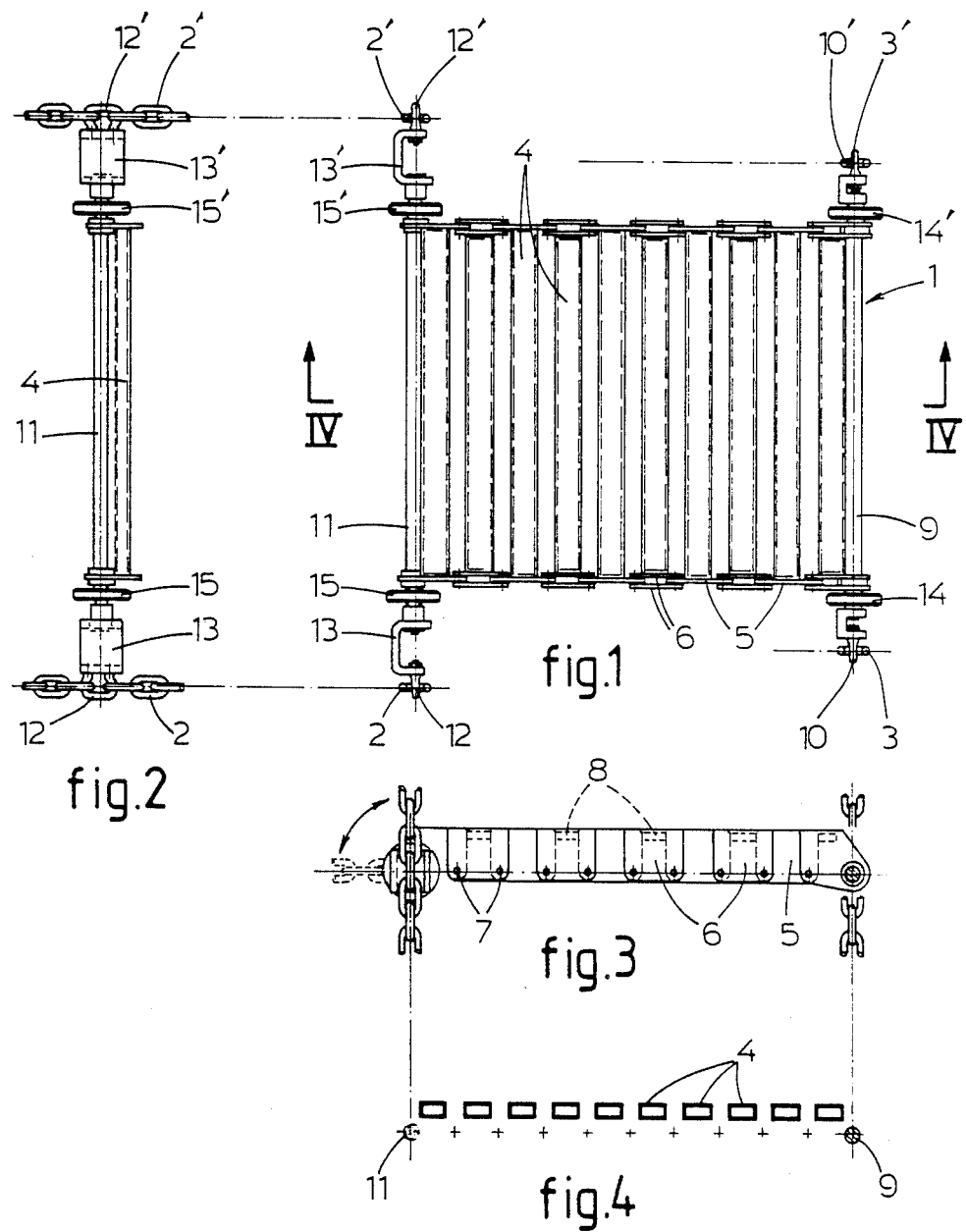

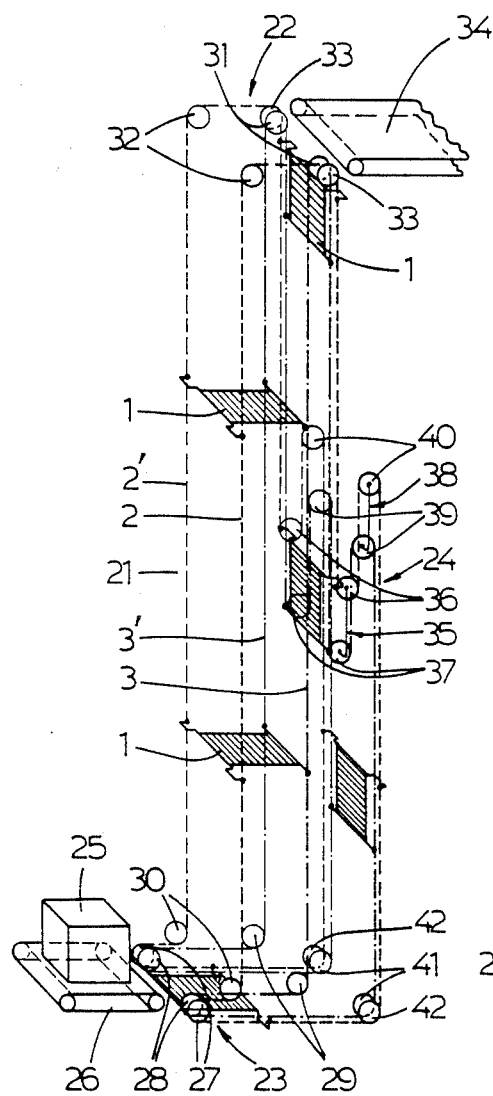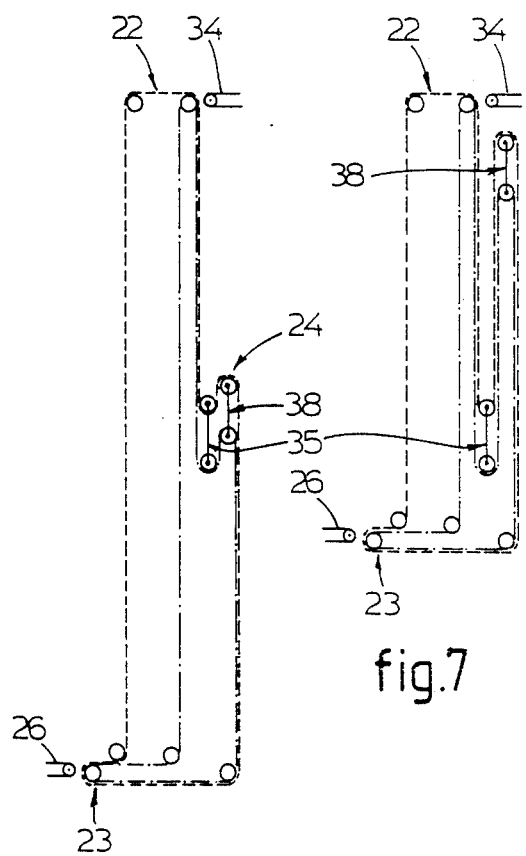
fig.5    fig.6    fig.7

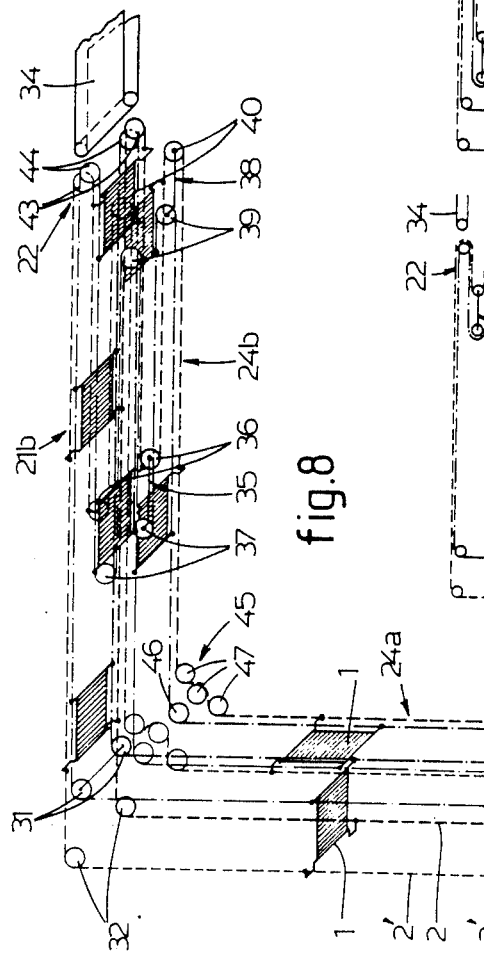

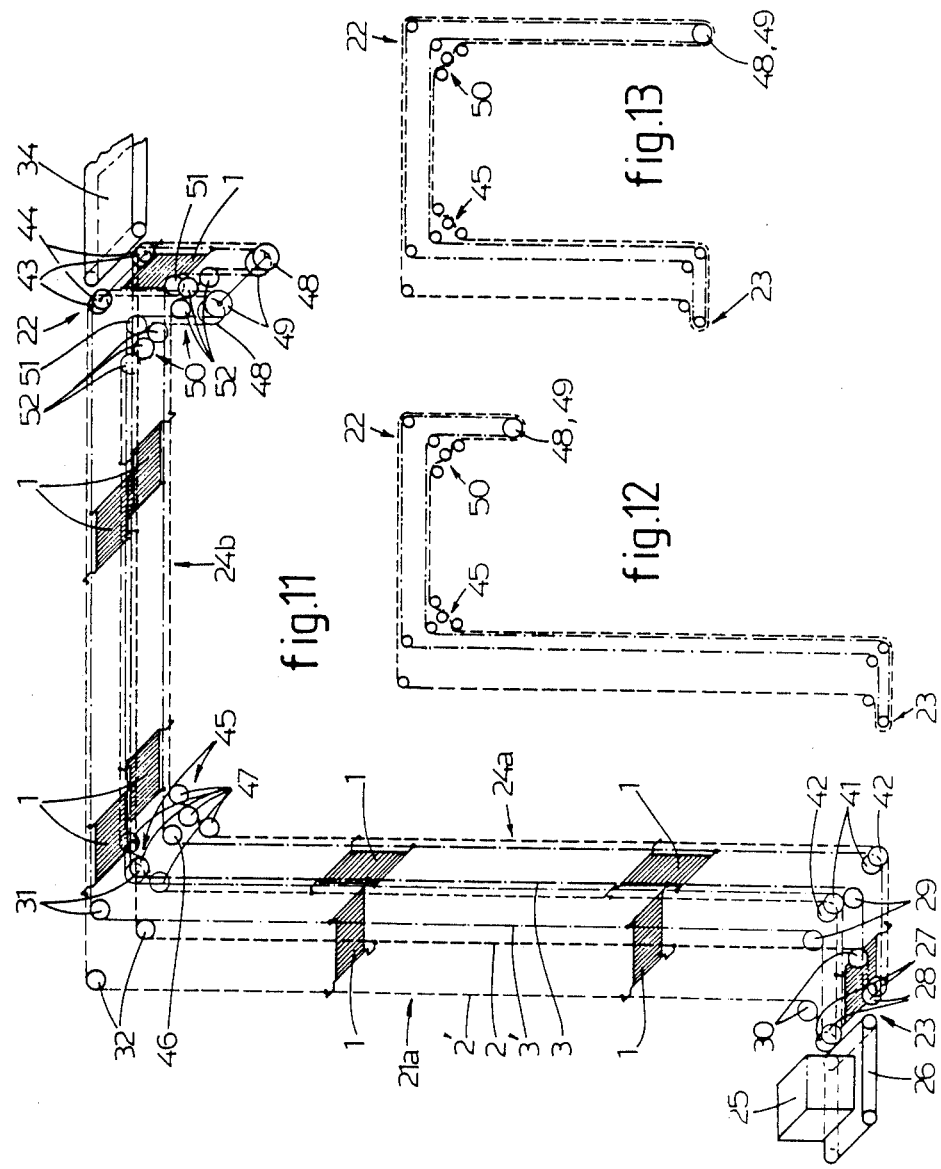

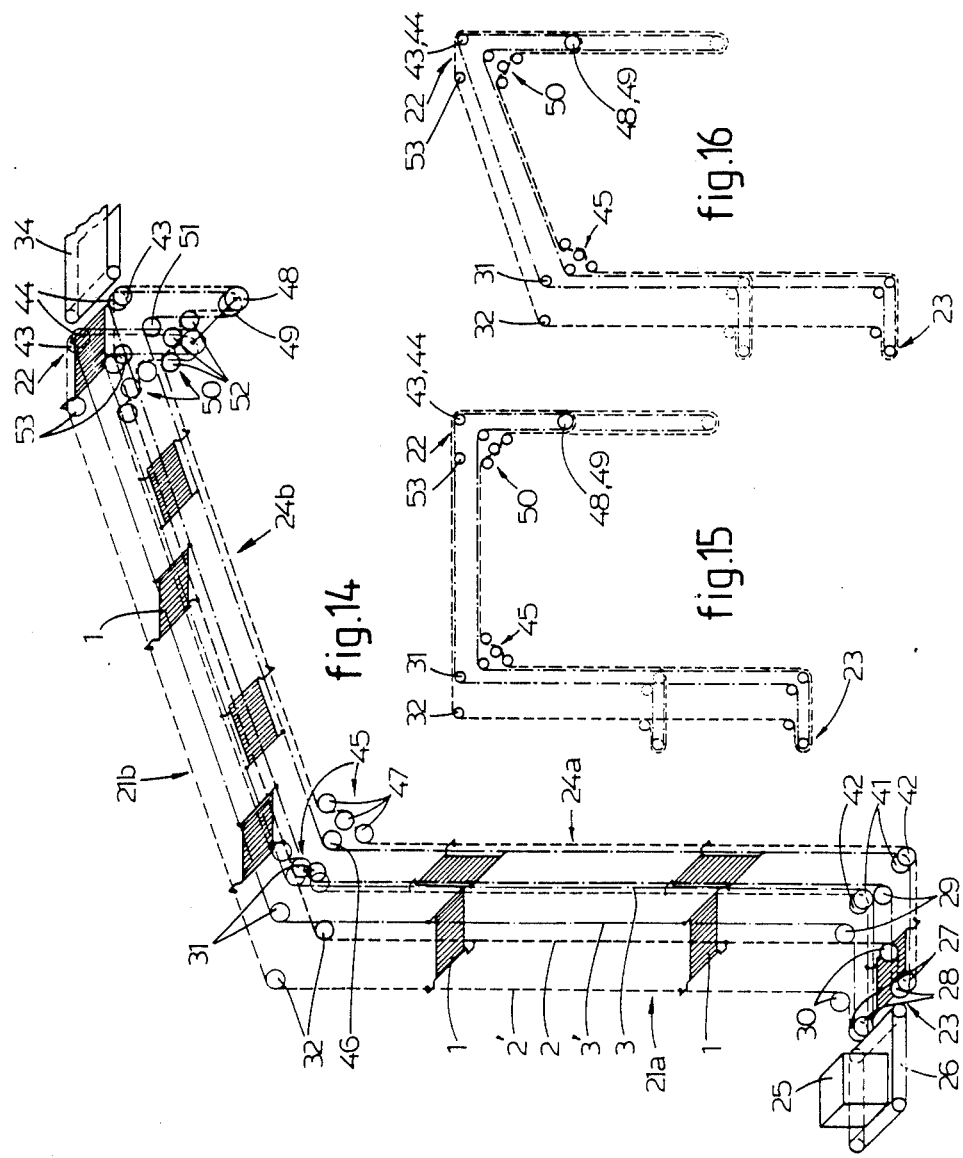

PLATFORM CONVEYOR

The invention relates to a platform conveyor, comprising a plurality of rectangular platforms, each being flexible in one direction, and two pairs of endless chains having equal lengths, and the pairs being connected to the corners at the front and rear side, respectively, of the platforms and being led over pairs of aligned guide sprockets, the chains extending substantially parallel to each other and guiding the platforms in a horizontal position through a transport part from an upper load or unload point to a lower unload or load point or vice versa, and bringing the platforms back through a return part, wherein the transport part includes a section having a substantial vertical component, and the platforms are deflected at both load and unload points.

Such platform conveyor is already known and is used for vertically transporting goods, of which the lower surface must be kept at all times in a horizontal position, such as is for example the case with goods piled up on pallets.

In this known platform conveyor the height between the upper load or unload point and the lower unload or load point is fixed.

However, in practice, situations occur wherein variations in height between the load and unload point would be very desirable, for instance in loading and unloading of ships. Preferably it should be possible that this loading and unloading of ships can be carried out at different levels.

Furthermore, the loading ratio of the ship influences the draught thereof, so that when the ship is being loaded or unloaded respectively it will go down or up respectively.

Besides, an additional variation in the height will occur in harbours where a tide prevails.

When the known platform conveyor is utilized, these variations have to be compensated for adjusting the height of the load or unload point connected to the quay, which is, however, onerous.

It is an object of the present invention to provide a platform conveyor of the type mentioned in the preamble, wherein this disadvantage is removed in an efficient way.

For this purpose the platform conveyor according to the invention is characterized in that adjustment means are provided, with which the height between the upper load or unload point and the lower unload or load point can be adjusted.

In a favourable embodiment of the platform conveyor according to the invention the return part is provided with a first guide assembly consisting of two coupled pairs of guide sprockets, over which the chains are deflected, and with a corresponding second guide assembly, over which the chains are deflected in a direction, which is opposite to the direction of deflection at the first guide assembly, both guide assemblies being movable relative to each other.

As an alternative or in combination therewith in the return part the chains and the platforms can be guided along two aligned pairs of guide sprockets, which are movable as a unit and at least at one side thereof a guiding assembly is provided, which guides the platforms in a direction which is opposite to the direction of flexibility of the platforms.

Herein it is possible that the two aligned pairs of guide sprockets, which are movable as a unit deflect the chains and the platforms substantially 180° and are movable in the plane of symmetry of this deflection perpendicularly to the axis of rotation of the guide sprockets of the two aligned pairs of guide sprockets, which are movable as a unit.

According to an important embodiment of the platform conveyor according to the invention the transport part can include at least one second section having a substantial horizontal component, wherein the upper load or unload point lies at the end of the second section facing away from the first section.

Herein the angle between the first and second section can be adjustable.

The invention will hereafter be elucidated with reference to the drawings, which schematically show four embodiments of the platform conveyor according to the invention by way of example.

FIG. 1 is a plan view of a platform of a platform conveyor according to the invention.

FIG. 2 is a view of the front or rear side of the platform of FIG. 1.

FIG. 3 is a side view of the platform of FIG. 1.

FIG. 4 is a section along the line IV—IV in FIG. 1.

FIG. 5 is a perspective view of a first embodiment of the platform conveyor according to the invention.

FIG. 6 is a side view of the platform conveyor of FIG. 5 in another position and on a reduced scale.

FIG. 7 is a side view of the platform conveyor of FIG. 5 in still another position and on a reduced scale.

FIG. 8 is a perspective view of a second embodiment of the platform conveyor according to the invention.

FIG. 9 is a side view of the platform conveyor of FIG. 8 in another position and on a reduced scale.

FIG. 10 is a side view of the platform conveyor of FIG. 8 in still another position and on a reduced scale.

FIG. 11 is a perspective view of a third embodiment of the platform conveyor according to the invention.

FIG. 12 is a side view of the platform conveyor of FIG. 11 in another position and on a reduced scale.

FIG. 13 is a side view of the platform conveyor of FIG. 11 in still another position and on a reduced scale.

FIG. 14 is a perspective view of a fourth embodiment of the platform conveyor according to the invention.

FIG. 15 is a side view of the platform conveyor of FIG. 14 in another position and on a reduced scale.

FIG. 16 is a side view of the platform conveyor of FIG. 14 in still another position and on a reduced scale.

In the drawings corresponding parts are indicated with the same reference numerals.

FIGS. 1–4 show a platform 1 of a platform conveyor according to the invention. To this platform 1 two pairs of 2, 2', and 3, 3' respectively are connected, with which the platform 1 can be conveyed.

The platform 1 is built of tubes 4 disposed perpendicularly to the direction of movement. At the ends of alternative tubes 4 one respectively two cross-plates 5, 6 are provided respectively, the cross-plates 5 and 6 extending parallel to each other. Each single cross-plate 5 extends partially between the two cross-plates 6 connected to the adjacent tubes 4 and the successive cross-plates 5 and 6 are hingedly connected to each other near their lower sides by means of a hinge joint 7. Between each set of cross-plates 6 near the upper side thereof a blocking cam 8 is arranged, which limits the hinging movement between the adjacent tubes 4 in such way that the tubes 4 considered with respect to their respective pivot axes cannot hinge upwardly and the platform 1 extends in a straight plane in its maximum upwardly bent position.

At one end of the platform 1 a rotatable rod 9 is provided, which carries a link 10, 10' respectively at its end, the links 10, 10' respectively being included in the chain 3, 3' respectively. At the other end of the platform 1 a rotatable rod 11 with links 12, 12' respectively is mounted, the links 12, 12' respectively being part of the chain 2, 2' respectively.

The chains 2, 2' extend further away from the platform 1 than the chains 3, 3' and between the rod 11 and the links 12, 12' respectively a connection means 13, 13' respectively is provided, which is curved in such way, that when the chains 3, 3' extend parallel to the platform 1 they can intersect the center line of the rod 11 and the links 12, 12' respectively. On the rods 9, 11 respectively wheels 14, 14' and 15, 15' respectively are provided adjacent to the platform 1.

FIGS. 5-7 show a first embodiment of the platform conveyor according to the invention. Herein, equally spaced apart platforms 1 are connected to two pairs of endless chains 2, 2' and 3, 3', respectively, of equal length. These chains 2, 2'; 3, 3' guide the platforms 1 through a transport part 21 in a horizontal position from an upper load or unload point 22 to a lower unload or load point 23 or vice versa and bring back the platforms 1 through a return part 24.

By way of a circulation of one of the platforms 1, wherein a load 25 is being conveyed upwardly, the different parts of the device will be elucidated more particularly.

The load 25 is supplied to the lower unload or load point 23, in this case serving as the load point, by means of a belt conveyor 26. When the platform 1 is bent around two aligned pairs of guide sprockets 27, 28 to a horizontal path the load 25 is delivered to the platform 1 at the same time. Under this loading the platform 1 acts as a rigid platform.

The front side of the platform 1 now follows the path of the chain pair 3, 3', which is led along a guide sprocket pair 29, while the rear side of the platform 1 traverses the path of the chain pair 2, 2' which is conducted over the guide sprockets 30. The guide sprocket pairs 29 and 30 are arranged in such way with respect to each other, that their center distance corresponds to the length of the platform 1 between the links 12, 12' and 10, 10' which are connected to the chain pairs 2, 2' and 3, 3'. The axes of rotation of the guide sprocket pairs 29, 30 lie also in a horizontal plane, so that the platforms 1 with their loads 25 move upwardly in a horizontal position when the chains 2, 2' and 3, 3' run upwardly in a parallel way.

In the embodiment shown by way of example the platform 1 traverses a vertical path. The chain pairs 2, 2'; 3, 3' respectively are led to guide sprocket pairs 32, 31 respectively, which are arranged in the same relative position as the guide sprocket pairs 30, 29 respectively. The chain pair 3, 3' at the front side of the platform 1 bends directly around the guide sprocket pair 31 downwardly in the vertical direction. The chain pair 2, 2' at the rear side of the platform 1, after being guided along the guide sprocket pair 32, is, however, led along a guide sprocket pair 33, which is aligned with the guide sprocket pair 31 before the vertical deflection is effected. As a consequence thereof the platform 1 will deliver the load 25 to a conveyor belt 34 at the upper load or unload point 22, serving in the present case as the unload point, while the platform 1 is deflected vertically.

In the return part 24 a first guide assembly 35 is provided, which consists of two coupled guide sprocket pairs 36 and 37. The center distance between these guide sprocket pairs 36 and 37 corresponds to the length of the platforms 1 between the connection points 10, 10' and 12, 12' to the chain pairs 3, 3' and 2, 2'. The guide assembly 35 is arranged such that the axes of rotation of the guide sprocket pairs 36 and 37 extend horizontally in the same plane.

In the same section of the return part 24 a corresponding second guide assembly 38 is provided, consisting of guide sprocket pairs 39, 40 and being displaceable in vertical direction. At the guide assemblies 35, 38 the chain pair 2, 2' is led around the guide sprocket pairs 36 and 40 and each thereof is deflected through 180°, in opposite directions. In the same way the chain pair 3, 3' is guided along the guide sprocket pairs 37 and 39.

When the platforms 1 are guided in the guide assemblies 35 and 38, the connecting points 10, 10' and 12, 12' of the platforms 1 with the chains 3, 3' and 2, 2' remain in the same relative position, so that the platforms 1 are guided through the guide assemblies 35 and 38 in a vertical position.

Via two aligned pairs of guide sprockets 42 and 41, the chain pairs 2, 2' and 3, 3' and the platforms 1 are guided back to the lower unload or load point 23.

An adjustment in height of the lower unload or load point 23 is obtained by moving the displaceable guide assembly 38 in the vertical direction (see FIGS. 6 and 7). The loops of the chains 2, 2' and 3, 3' formed between both guide assemblies 35 and 38 are enlarged, when the distance between both guide assemblies 35 and 38 is increased. Herewith the guide sprocket pairs 27, 28, 29, 30, 41, 42 near the lower unload or load point 23 are pulled up and the height between the upper load or unload point 22 and the lower unload or load point 23 decreases. When the guide assembly 38 is moved downwardly, whereby the distance between both guide assemblies 35 and 38 decreases, the height between the load and unload points increases.

FIGS. 6 and 7 show the platform conveyor in its extreme positions.

FIGS. 8-10 illustrate a second embodiment of the platform conveyor. Herein the transport part 21 includes besides the first vertical section 21a a second section 21b, which extends horizontally and which comprises support rails for the wheels 14, 14' and 15, 15', the end of the second section 21b facing away from the first section 21a lies at the upper load or unload point 22. Here both chain pairs 2, 2' and 3, 3' are being deflected through 180° around two aligned pairs of guide sprockets 43 and 44.

The return part 24 is also divided into sections 24a, 24b respectively, which extend parallel to the sections 21a, 21b respectively of the transport part 21. Herein the guide assemblies 35 and 38 are provided in the horizontal section 24b of the return part 24, and in this case the guide assembly 35 can be displaced horizontally (see FIGS. 9 and 10).

At the transition of the two sections 24a and 24b of the return part 24 the platforms 1 have to be guided through 90° in a direction opposite to the direction in which the platforms 1 can be bent. For this purpose the platforms 1 are guided over a guiding assembly 45 at this transition. In the embodiment shown in the drawing by way of example the guiding assembly 45 consists of a guide sprocket pair 46, along which the chain pair 3, 3' is led and three guide sprocket pairs 47 through which the chain pair 2, 2' is guided. Therefore both chain pairs 2, 2' and 3, 3' run through differently curved paths, the length of these paths, however, being equal.

When the platforms 1 pass the guiding assembly 45, the distance between the connecting points 10, 10' and 12, 12' of the platforms 1 and the chain pairs 3, 3' and 2, 2' is smaller than the length of the platforms 1 between these connecting points 10, 10' and 12, 12'. Therefore the platforms 1 will sag down as a result of gravity and the platforms 1 can be guided in a simple way in a direction which is opposite to the direction in which the platforms 1 are flexible. The other constructional features of this embodiment correspond with those of the first embodiment.

FIGS. 11-13 show a third embodiment of the platform conveyor.

Herein the transport part 21 and the return part 24 include again a vertical section 21a, 24a respectively and a horizontal section 21b, 24b respectively. However, directly after the upper load or unload point 22 the return part 24 is led over two aligned pairs of guide sprockets 48, 49, which can be displaced as a unit. At these vertically movable guide sprockets 48, 49, the chains 2, 2'; 3, 3' and the platforms 1 are reversed through 180° towards a guiding assembly 50, which has the same structure as the guiding assembly 45. The guiding assembly 50 guides the platforms 1 to a horizontal position through guide sprockets 51 and 52.

In this embodiment the guide assemblies 35 and 38 have been omitted, but as an alternative they may be combined with the adjustment means shown here. The guide sprocket pairs 48, 49 which can be displaced as a unit here serve for the height adjustment of the lower unload or load point 23.

FIGS. 12 and 13 illustrate the extreme positions of this embodiment of the platform conveyor.

The other parts correspond with those of the first or second embodiment respectively.

FIGS. 14-16 show a fourth embodiment of the platform conveyor, the structure thereof substantially corresponds to the structure of the third embodiment.

However, in this fourth embodiment it is possible to adjust the horizontal section 21b and 24b respectively of the transport part 21 and return part 24 respectively in such way that they are inclined at an angle to the horizontal. This is obtained by making the guide sprocket pairs 31 and 32 and the guiding assembly 45 movable in the vertical direction. As a result of this angular adjustment the height between the upper load or unload point 22 and the lower unload or load point 23 is adjustable.

In order to keep the platforms 1 in a horizontal position at the sloping second section of the transport part 21, the chain pair 2, 2' is led over a guide sprocket pair 53 at the upper load or unload point 22. This guide sprocket pair 53 is arranged in such way with respect to the guide sprocket pairs 43, 44 that in the section between the guide sprockets 31; 32 and 43, 44; 53 the chain pairs 2, 2' and 3, 3' form a parallellogram in the plane of the drawing at every inclination of the section 21b.

This can be seen from FIGS. 15 and 16, wherein both possibilities of the height adjustment of this embodiment of the platform conveyor are illustrated.

The invention is not restricted to the embodiments shown in the drawing by way of example, which can be varied in different ways within the scope of the invention.

I claim:

1. A platform conveyor, comprising:
   first and second pairs of endless chains having equal lengths and being guided over pairs of aligned guide sprockets, the chains of each pair of chains extending substantially parallel to each other;
   a plurality of rectangular platforms, each of said platforms being flexible in one direction and being rigid when supporting a load, the platforms being connected to the chains in a space apart relationship, each corner of the platform engaging a respective chain of the two pairs of chains, such that the corners at the front of the platforms being connected to the first pair of chains and the corners at the rear of the platforms being connected to the second pair of chains;
   a first upper load and unload point and a second lower load and unload point, each load and unload point adapted to deliver goods to the platforms and receive goods from the platforms when the platforms are deflected adjacent thereof;
   wherein the conveyor comprises a transport part and a return part, the chains in the transport part running such that the platforms extend substantially horizontally when passing through the transport part, the transport part and the return part include a first section having a substantially vertical component;
   adjustment means for adjusting the height between the first upper load and unload point and the second lower load and unload point, comprising first and second parallel guide assemblies provided in their return part, each guide assembly including first and second spaced apart pairs of guide sprockets, the first pair of chains being passed over the first pair of guide sprockets of the first guide assembly and over the first pair of guide sprockets of the second guide assembly, while the second pair of chains is passed over the second pair of guide sprockets of the first guide assembly and over the second pair of guide sprockets of the second guide assembly, the direction of deflection of the pairs of chains in said first guide assembly being opposite to the direction of deflection of the pairs of chains in said second guide assembly.

2. A platform conveyor as claims in claim 1, wherein the center distance between the pair of each guide assembly corresponds with the length of the platforms between the connecting points with the chain pairs so that said platforms are guided in a straight position through the guide assemblies.

3. A platform conveyor as claimed in claim 1, wherein at each guide assembly the chains are deflected through substantially 180°, and at least one of the both guide assemblies is movable in the direction of a line, which substantially perpendicularly intersects the axis of rotation of the guide sprockets of each pair of guide sprockets of the movable guide assembly.

4. A platform conveyor, comprising:
   first and second pairs of endless chains having equal lengths and being guide over pairs of aligned guide sprockets, the chains extending substantially parallel to each other;
   a plurality of rectangular platforms, each of said platforms being flexible in one direction and being rigid when supporting a load, the platforms being connected to the chains in spaced apart relationship, each corner of the platform engaging a respective chain of the two pairs of chains, such that the corners at the front of the platforms being connected to the first pair of chains and the corners at the rear of the platforms being connected to the second pair of chains and such that one chain pair of closer to the platforms than the other chain pair;

a first upper load and unload point and a second lower load and unload point, each load and unload point adapted to deliver goods to the platforms, when the platforms are deflected adjacent thereof;

means for adjusting the height between the first upper load and unload point and the second lower load and unload point;

wherein the conveyor comprises a transport part and a return part, the chains in the transport part running such that the platforms extend substantially horizontally when passing through the transport part, the transport part and the respective return part include a first section having a substantially vertical component and second and third sections having a substantially horizontal component, said second and third sections connecting to lower and upper ends respectively of the first section, at the transition between the first and third section of the return part the chains are led over a guiding assembly, which guides the platforms around a substantially 90 degree turn in such a way that the platforms are allowed to bend in their direction of flexiblity under the action of gravity, the guiding assembly comprising at least one guide sprocket pair, over which the chain pair laying closest to the platforms is led, and of at least one further guide sprocket pair, over which the chain pair lying further away from the platform is guided, and the guide sprocket pairs of the guide assembly are arranged such that during the deflection of the platforms both chain pairs traverse differently curved paths of equal lengths.

5. A platform conveyor as claimed in claim 4, wherein during the deflection of the platforms at the guiding assembly the distance between connecting points of the platforms with the chain pairs is smaller than the length of the platforms between these connecting points, and gravity aids in bending the platform.

6. A platform conveyor as claimed in claim 4, wherein the chain pair lying closest to the platform is led over one guide sprocket pair, and the chain pair lying further away from the platform is led between a plurality of guide sprockets.

7. A platform conveyor as claimed in claim 6, wherein the chain pair lying further away from the platform is guided over first and third guide sprocket pairs and underneath a second guide sprocket pair.

* * * * *